United States Patent [19]

Callaghan, Jr.

[11] Patent Number: 5,533,271

[45] Date of Patent: Jul. 9, 1996

[54] LONG RANGE SLIDING BALL BAR TEST GAGE

[76] Inventor: Robert P. Callaghan, Jr., 98 Beach St., Westerly, R.I. 02891

[21] Appl. No.: 294,564

[22] Filed: Aug. 23, 1994

[51] Int. Cl.$^6$ ............................ G01B 5/14; G01M 19/00
[52] U.S. Cl. ................... 33/502; 33/784; 33/811; 73/1 J
[58] Field of Search ............................ 33/502, 503, 567, 33/567.1, 784, 791, 810, 811, 706; 73/1 J; 356/356, 358

[56] References Cited

U.S. PATENT DOCUMENTS

| | | | |
|---|---|---|---|
| 4,261,107 | 4/1981 | Coleman et al. | 356/356 |
| 4,435,905 | 3/1984 | Bryan . | |
| 4,459,749 | 7/1984 | Rieder et al. | 33/784 |
| 5,052,115 | 10/1991 | Burdekin . | |
| 5,111,590 | 5/1992 | Park | 33/502 |
| 5,214,857 | 6/1993 | McMurtry et al. | 33/502 |
| 5,259,120 | 11/1993 | Chapman et al. | 33/502 |

FOREIGN PATENT DOCUMENTS

| | | | |
|---|---|---|---|
| 4139309 | 9/1992 | Germany | 33/567 |
| 61-209857 | 9/1986 | Japan | 33/502 |
| 1352172 | 11/1987 | U.S.S.R. | 33/502 |
| 2242747 | 10/1991 | United Kingdom | 33/810 |

OTHER PUBLICATIONS

*CMM accuracy measurements*, Benjamin R. Taylor, Dec. 1986 issue of *Quality*, 4 pages.
Malcolm Gull; *NIST/LLNL Workshop For Machine Tool Characterization;* Jun. 1990.
"American Machinist"; *How Accurate Is Your Machine?;* Oct. 1991.
J. B. Bryan; *A Simple Method For Testing Measuring Machines And Machine Tools* "Precision Engineering"; 1982; pp. 125–138; Part 2: Construction Details.

J. B. Bryan; *A Simple Method For Testing Measuring Machines And Machine Tools* "Precision Engineering"; 1982; pp. 62–69; Part 1: Principles and applications.

M. Burdekin and J. Park; *Contisure–A Computer Aided System For Assessing The The Contouring Accuracy Of NC Machine Tools;* Matador Conf.; Apr. 1988.

*Primary Examiner*—Christopher W. Fulton
*Attorney, Agent, or Firm*—Salter & Michaelson

[57] ABSTRACT

A linear test gage for testing the accuracy of machine tools is operable for out of roundness measurements as well as long-range linear measurements. The test gage consists of a linear guide assembly, first and second reference elements, and a long-range linear measurement device. The linear guide assembly includes an elongated guide profile, a guide rail secured to the guide profile, and a slide which is slidably movable relative to the guide rail. The first reference element is attached to the first end of the guide profile and the second reference element is attached to the slide so that the reference elements are relatively movable over a length of about 30–40 inches. A first knuckle assembly secures the first reference element in a fixed position relative to the machine tool. A second knuckle assembly secures the second reference element to an active element of the machine tool. During testing, the active machine element is programmed to move the second reference element along a predetermined trajectory wherein the linear guide assembly permits co-linear movement of the reference elements as the active element moves the second reference. The long-range linear measuring device measures the distance between the reference elements as the second reference element is moved. The long range measurement capability allows use of the device in both circular and linear measurements. The test gage further includes a counter weight assembly and an anti-rotation device.

16 Claims, 3 Drawing Sheets

LONG RANGE SLIDING BALL BAR TEST GAGE

BACKGROUND AND SUMMARY OF THE INVENTION

The instant invention relates to accuracy testing devices or gages for testing the accuracy of machine tools, including computer controlled robots, and more particularly to a sliding ball bar test gage operable for long range linear measurements, as well as circular or spherical measurements at infinitely adjustable radii.

Telescoping ball bar test gage devices for circular or spherical (out of roundness) testing of machine tools have heretofore been known in the art. In this regard, the U.S. Pat. Nos. to Bryan No. 4,435,905 and Burdekin No. 5,052,115 represent the closest prior art to the subject invention of which the applicant is aware. The patent to Bryan discloses a telescoping magnetic ball bar test gage for testing the accuracy of computer controlled machine tools. Two gage balls are held and separated from each other by a fixture which allows slight telescoping movement but not lateral movement. The telescoping fixture comprises a parallel reed flexure unit and a rigid bar. The telescoping fixture is really only operative for telescoping movement of a small fraction of an inch as provided for by a telescoping LVDT in the parallel reed flexure unit. One gage ball is secured by a magnetic knuckle socket assembly fixed to a central point on the work table of the machine to be tested. The other gage ball is secured by another magnetic knuckle socket assembly which is attached to the active movable element of the machine. The machine is then programmed in such a manner that the center of the gage ball on the active element of the machine is directed to execute a prescribed trajectory, all points being equidistant from the center of the fixed gage ball. As the moving ball executes its trajectory, changes in radial distance between the centers of the two balls caused by inaccuracies in the machine are determined by a linear variable differential transformer (LVDT) assembly actuated by the parallel reed flexure unit. The rigid bar of the telescoping unit is provided with extensions in order to test accuracy at different fixed size circular trajectories. The patent to Burdekin discloses another machine tool testing device comprising a first ball probe adapted to be fixed to the work table of the machine tool and a second ball probe adapted to be attached to the spindle of the machine tool. The testing device further includes a rigid fixture for holding the ball probes in spaced linear relation and for measuring the distance between the centers of the two ball probes as the second ball probe is moved in a circle around the first ball probe. The fixture comprises four round rods which are held in a square array by two spacers having holes therein for receiving the rods. At one end of the rods is a socket assembly for engagement with the fixed ball probe on the work table. The other end of the rods extend outwardly from a spacer wherein they are operable sliding engagement over the movable ball probe on the active element. A single axis transducer is mounted in the spacer adjacent the free ends of the rods for engagement with the movable ball probe. The machine tool is programmed such that the movable ball probe is moved in a circular trajectory around the fixed ball probe. As the probe is moved, the transducer measures slight changes in the distance between the centers of the two ball probes caused by inaccuracies in the machine tool.

While the above devices are effective for measuring changes in radial distance between two ball probes as one ball probe is moved relative to the other fixed ball probe, they have several drawbacks which have prevented their widespread marketing and use. The first drawback is their limited utility. Both the Bryan and Burdekin devices are only operable for circular testing at fixed radii. The fixtures of both Bryan and Burdekin are of fixed length and the measurement devices are operative for measuring only small changes in the radial distance between the ball as they are moved relative to one another. In order to test at several different radii in the Bryan device, additional links need to be added to the fixture. In order to test at several different radii in the Burdekin device, a different length fixture must be utilized. It can thus be seen that testing procedures at several different radii requires disassembly and reassembly of the device for each test.

Another drawback is that the Bryan and Burdekin devices are not operable for linear testing. When testing machine tools for accuracy, many different types of tests must be conducted in order to ensure accuracy in all dimensions. In addition to circular or spherical tests, linear tests are also performed to determine volume, distance, velocity, squareness, and straightness. Linear and volumetric testing are usually accomplished by means of a laser measurement system in which various precision laser optics are set up on the work table of the device and a laser head is employed to fire a laser beam through the optics wherein various linear measurements are obtained. The LVDT of Bryan, and the single axis transducer of Burdekin are only operable for measuring distances in fractions of an inch and thus are not useful for linear testing.

Yet another drawback to all the prior art devices, including the laser measurement system, is that they are extremely difficult to handle, and difficult to set up for testing. Because the devices are difficult to handle, the testing procedures are time consuming, thus tying up expensive machines for unknown periods of time. It can thus be seen that the prior art testing devices are neither cost effective nor time efficient for regular periodic testing, maintenance, and calibration of machine tools.

The instant invention provides a long range linear test gage which is operable for out of roundness measurements, i.e. circular and spherical tests, as well as longer range linear and volumetric tests. The instant test gage comprises an elongated linear guide assembly, a first reference element defining a first locus, a second reference element defining a second locus, and a linear measuring device capable of measuring long distances at highly accurate tolerances. The linear guide assembly includes an elongated guide profile, a guide rail secured to the guide profile, and a slide which is slidably movable relative to the guide rail between the first and second ends of the guide profile. The first reference element is attached to the first end of the guide profile and the second reference element is attached to the slide. A first magnetic knuckle or socket assembly is provided for securing the first reference element in a fixed position relative to the machine tool. A second magnetic knuckle or socket assembly is provided for securing the second reference element to an active element of said machine tool. During testing, the active machine element is operative for moving the second reference element along a predetermined trajectory, i.e. circular, spherical or linear. The linear guide assembly permits co-linear movement of the reference elements as the active machine tool element moves the second reference element along a predetermined trajectory. The linear measuring device comprises a linear encoder in a first embodiment. The linear encoder includes a scannable measurement index affixed to the guide profile and a scanning head secured to the slide for scanning the index as the second reference element is moved along its predetermined trajectory. In another embodiment, the linear measurement device comprises a laser measurement system wherein a linear interferometer is mounted to the slide and a linear reflector is mounted adjacent the first end of the guide profile. A laser head is provided for firing a laser beam through the linear interferometer either directly or through fiber optics and down the length of the guide profile. A laser detector is mounted to the slide for reading the reflected laser beam wherein linear measurements are read. The test gage further includes a counterweight for counterbalancing the weight of the guide system and measurement device. The test gage still further includes anti-rotation apparatus for preventing rotation or swinging movement of the test gage during use. The instant measuring device is simple to operate and significantly reduces test time. The device is also much more cost effective than the prior art devices.

Accordingly, it is an object of the instant invention to provide a highly accurate linear test gage for testing the accuracy of machine tools.

It is another object to provide a linear test gage which is inexpensive.

It is another object to provide a test gage which is operable for linear, volumetric and out of roundness testing.

It is another object to provide a universal test gage which is simple to set up for numerous tests and simple to operate.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
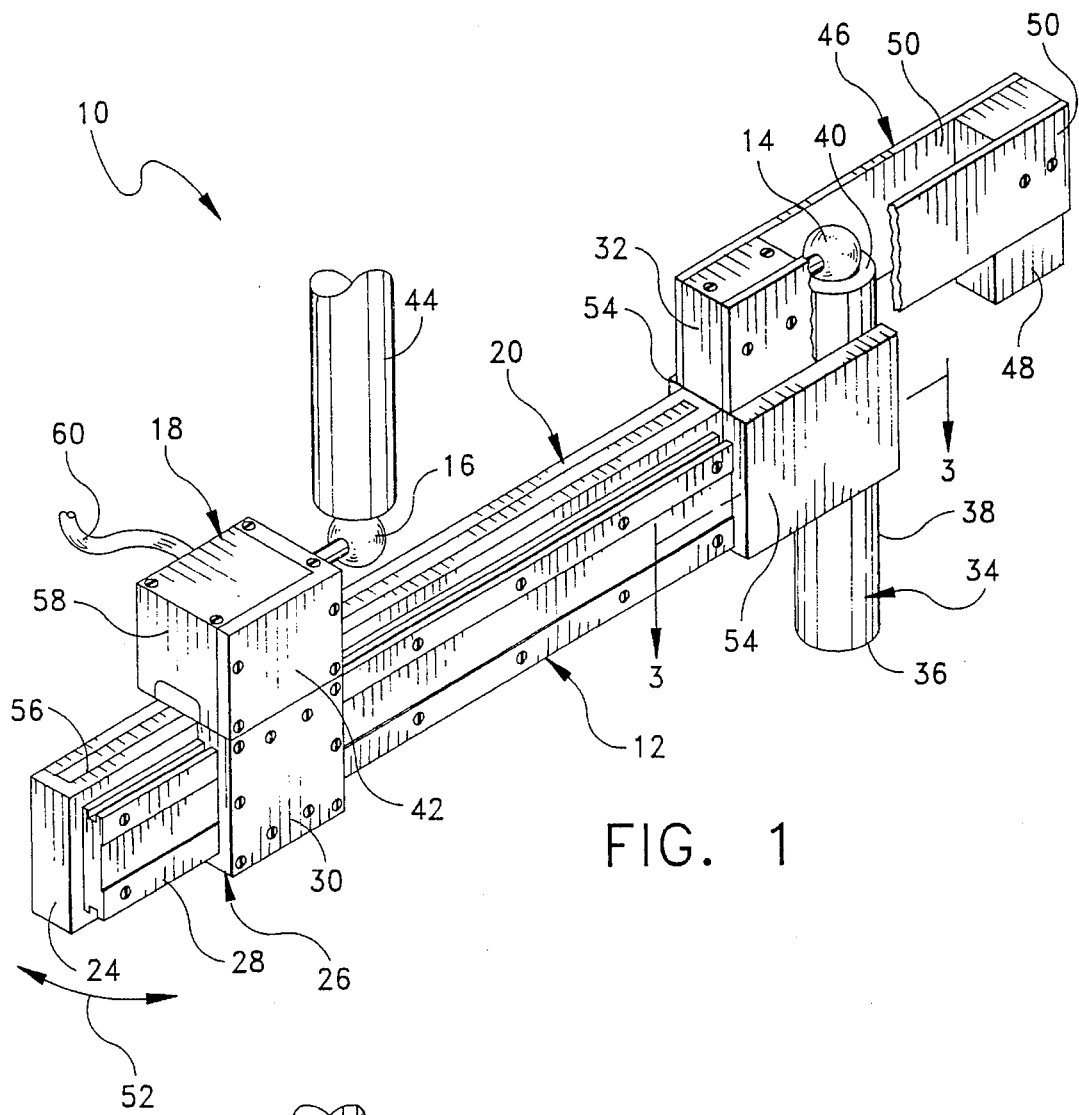
FIG. 1 is a perspective view of a first embodiment of the instant long range magnetic ball bar test gage.
Figure 2:
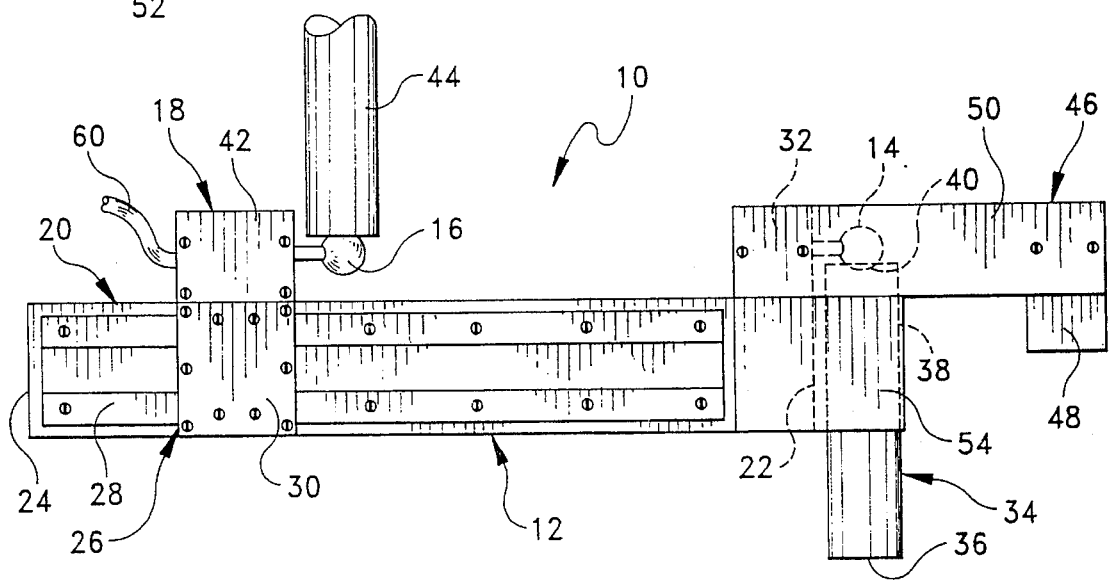
FIG. 2 is a side view thereof.
Figure 3:
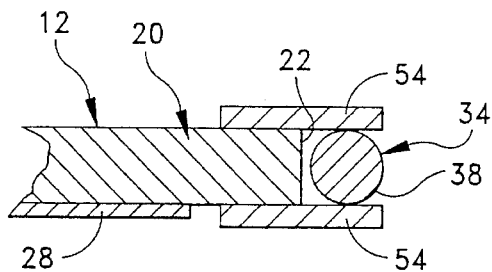
FIG. 3 is a cross-sectional view thereof taken along line 3—3 of FIG. 1.

Referring now to the drawings, a first embodiment of the long range linear test gage of the instant invention is illustrated and generally indicated at 10 in FIGS. 1–3. The test gage 10 comprises an elongated linear guide assembly generally indicated at 12, a first ball ended reference element 14 defining a first locus at the center thereof, a second ball ended reference element 16 defining a second locus at the center thereof, and a long-range linear measurement device generally indicated at 18 for measuring a linear distance between the two loci.

The linear guide assembly 12 includes an elongated guide profile or bar, generally indicated at 20 having first and second ends, 22 and 24 respectively. The guide profile 20 is preferably about 40–45 inches in length and is preferably constructed from steel. The linear guide assembly 12 further comprises a high accuracy linear ball bearing guide generally indicated at 26. The guide 26 includes a guide rail 28 which is secured to the side of the guide profile 20, and a slide 30 which is slidably movable relative to the guide rail 28. The guide rail 28 preferably extends along substantially entirely the length of the profile 20 so that the slide 30 is movable between the first and second ends 22 and 24 of the guide profile 20. High accuracy linear guides 26 such as those contemplated herein are well known in the art. For example, high accuracy linear guides suitable for the instant invention are manufactured by THK, Inc. While the instant embodiment is illustrated as including a linear ball bearing guide 26, it is to be understood that other high accuracy linear guide systems, such as air, or frictionless bearing systems, are also suitable.

The first and second ball ended reference elements 14 and 16 preferably comprise 1.0000 inch chrome steel precision reference balls. The first reference element 14 is attached by any suitable means, such as by a threaded connection, to an upwardly extending appendage 32 at the first end 22 of the guide profile 20. The first reference element 14 is attached so that it extends outwardly beyond the first end 22 of the guide profile 20. A first magnetic knuckle assembly generally indicated at 34 is provided for securing the first reference element 14 in a fixed position relative to the machine tool (not shown). The magnetic knuckle socket assembly 34 includes a base portion 36 which is securable to the work table of the machine tool, an upright body portion 38 which extends upwardly from the base portion 36, and a concave socket, or seat 40, for receiving the steel reference ball 14. The magnetic knuckle assembly 34 is well known in the art, and therefore no further description is believed to be necessary. The magnetic knuckle assembly 34 accurately maintains the reference element 14 in a fixed position such that the locus, i.e. center of the reference ball 14, is maintained in a fixed position relative to the machine tool.

The second reference element 16 is secured by any suitable means to the slide 30 of guide 26 for co-linear movement relative to the first reference element 14. More specifically, the reference element 16 is secured to an L-shaped flange 42 which is in turn secured to the slide 30 as illustrated in FIG. 1. A second magnetic knuckle assembly 44 is provided for securing the second reference element 16 to an active element (not shown) of the machine tool. During testing, the active machine element is operative for moving the magnetic socket 44, and thus the second reference element 16, along a predetermined trajectory, i.e. circular, spherical, linear, or volumetric. While the means for securing the ball ended reference elements to the machine tool have herein been described as magnetic knuckle assemblies it is to be understood that other types of mechanical engagement assemblies are also contemplated.

In use of the test gage 10, the linear guide assembly 12 permits only co-linear movement of the reference elements 14 and 16 as the active element moves the second reference element 16 along its predetermined trajectory, i.e. the linear guide assembly 12 permits the second locus to move along a line drawn between the centers of the first and second reference elements 14 and 16.

When mounting the test gage 10 to the magnetic knuckle assemblies 34 and 44, the first reference element 14 rests on top of the first knuckle assembly 34. However, the second reference element 16 is magnetically, or otherwise suitably suspended, from the second knuckle assembly 44. In order to stabilize the balance of the device 10 and minimize any possibility of the second reference element 16 becoming unseated from its upside down position during operation, a counter weight assembly generally indicated at 46 is provided to counterbalance the weight of the guide profile 20, the guide rail 28, the slide 30, the second reference element 16, and the linear measurement device 18. The counter weight assembly 46 comprises a weighted element 48 and two parallel suspension arms 50 for suspending the weighted element 48. The suspension arms 50 are secured in spaced relation on opposite sides of the upright appendage 32 and extend outwardly beyond the first reference element 14. The weighted element 48 is secured between the free terminal ends of the suspension arms 50 such that the weighted element 48 is positioned beyond the first reference element 14. The test gage 10 is thereby pivotably balanced on top of the first knuckle assembly 34.

While the linear guide assembly 12 is highly effective for permitting only co-linear movement of the reference elements 14 and 16 during testing, the spherical reference elements 14 and 16 and concave seats 40 in the knuckle assemblies 34 and 44 tend to permit a slight rotation or swinging of the test gage 10. (See arrow 52 FIG. 1). For example, rotation or swinging movement of the test gage 10 may occur if the machine tool or test gage 10 is accidentally jarred. Such an impact may cause a slight swinging movement of the test gage 10. In order to prevent rotation or swinging of the test gage 10, the guide profile 20 is provided with anti-rotation apparatus. The anti-rotation apparatus comprises a pair of spaced parallel arms 54 which are attached to opposite sides of the first end 22 of the guide profile 20. The arms 54 extend outwardly towards the magnetic knuckle assembly 34 and snugly engage the outside surface of the body portion 38 of the magnetic knuckle 34 at diametrically opposed positions.

The long range linear measuring device 18 preferably comprises a linear encoder, or scannable measurement index apparatus having the capability of measuring linear distances of up to forty inches. The linear measuring device 18 includes a scannable measurement index 56 and a scanning head 58. The measurement index 56 is affixed along the upper edge of the guide profile 20 and the scanning head 58 is secured to the slide 30 for sliding movement up and down the length of the guide profile 20. As the second reference element 16 is moved along its predetermined trajectory, the scanning head 58 moves over the index 56 and continuously scans the index 56 to provide measurements. In the instant embodiment, the linear measurement device preferably comprises a phase grating linear encoder, such as Model No. LIP 101R manufactured by Heidenhain, Inc. The Heidenhain encoder is operable for highly precise measurement steps down to 0.000 000 5 inches up to lengths of 40.1 inches. Output from the scanning head 58 is provided to a display device (not shown) or a computer (not shown) via cable 60. Other types of scanning measurement devices which are also suitable for use with the instant device 10 include glass scale diffraction, magnetic tape, reflective tape, reflective glass, magnetic, and inductive systems.

In use, the instant test gage 10 is operable for numerous different testing procedures. Circular, or out of roundness, tests are performed in the same manner as with the prior art devices, i.e. the active element is programmed to move the locus of the second reference element 16 in a circular trajectory with all points being equidistant from the first locus. In the prior art devices, changes in radial distance between the loci were measured by either an LVDT in a parallel reed flexure unit (Bryan), or a single axis transducer (Burdekin). In the instant test gage 10, the measurements are made by the linear encoder 18. The step measurements of the Heidenhain linear encoder 18 provide the same, if not better, accuracy as the previous devices. However, the instant test gage 10 also provides several significant advantages over the prior art devices. In most cases, several circular test traces are performed at different diameters to determine accuracy. In the prior art devices, the supporting fixtures for the reference elements had to be disassembled to add extension bars or to completely replace the supporting fixture each time a different radius was desired. Since the instant test gage 10 has a linear slide range of about forty inches, the reference element 16 can be quickly moved to a different location along the length of the guide profile 20 to provide different radii without disassembly. In addition, the slide 30 is infinitely adjustable along the length of the guide rail 28. The test operator is thus not limited to fixed radii as in the prior art devices. Moreover, the instant test gage 10 is also operable for linear measurements. In this case, the active machine element is simply programmed to position incrementally along a linear trajectory for a given distance, i.e. 0–40 inches. The linear distance is measured very accurately by the linear encoder 18. Volumetric measurements are also easily made by instructing the active machine element to position incrementally along an angled linear trajectory, i.e. from one corner of a box to the opposite corner. It is again pointed out that all of these measurement can be quickly and easily performed without removing the test gage from its initial mounting position.

Figure 4:
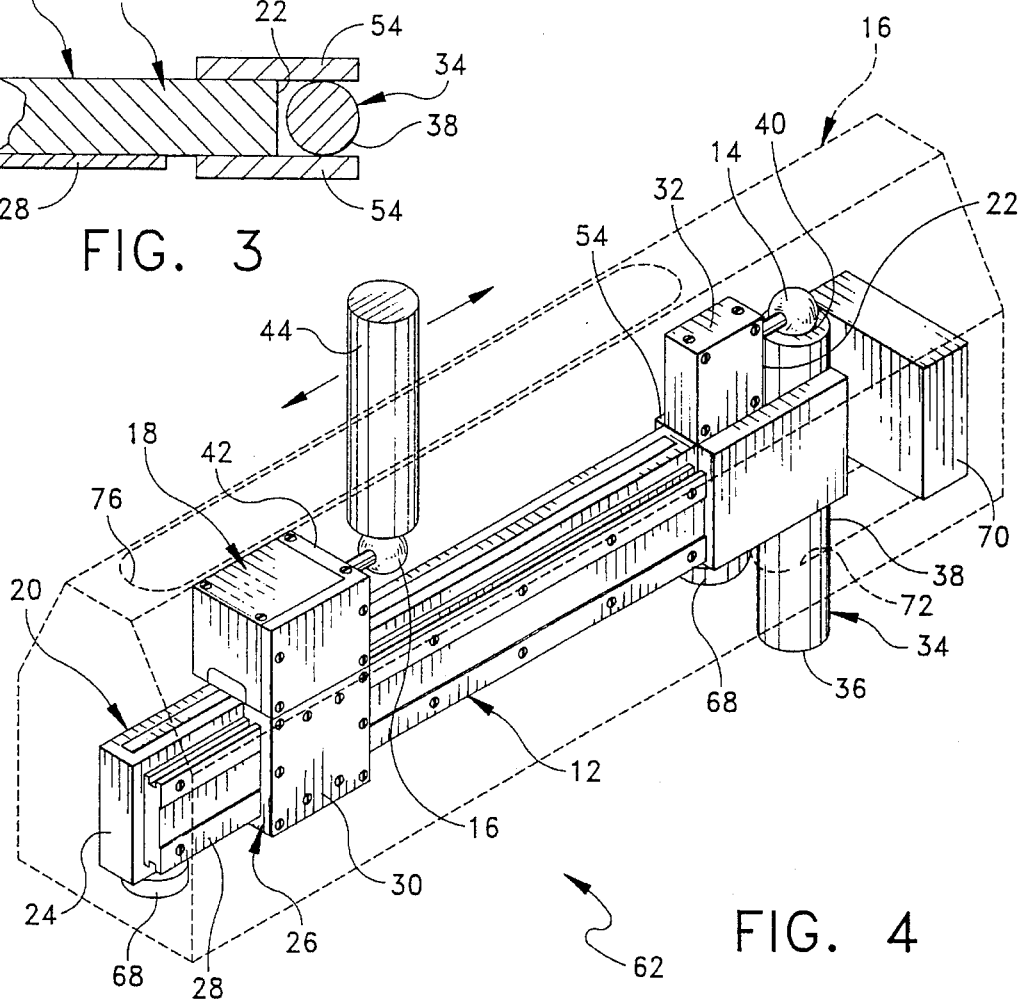
FIG. 4 is a perspective view of another embodiment of the instant test gage.
Figure 5:
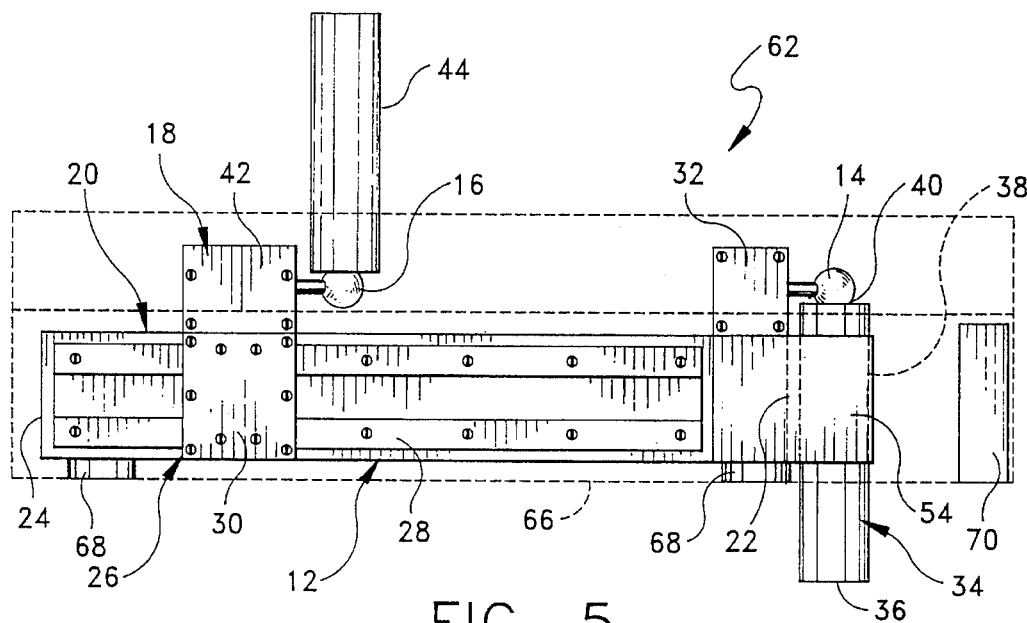
FIG. 5 is a side view thereof.

Referring now to FIGS. 4 and 5 a second embodiment of the instant test gage is illustrated and generally indicated at 62. The second embodiment 62 is generally similar to the first embodiment 10 with the exception that the second embodiment 62 includes a protective enclosure generally indicated at 64 (shown in broken lines). The protective enclosure 64 preferably comprises a lightweight plastic or metallic material. The guide profile 20 is mounted to a bottom wall 66 (FIG. 5) within the enclosure 64 by means of shock absorbent mounts 68, such as rubber mounts. In this manner, any impact to the outer enclosure 64 is dissipated or reduced before being transferred to the guide profile 20. The second embodiment 64 also includes a counterweight element 70. However, the counterweight element 70 is mounted to the bottom wall 66 of the enclosure 64 adjacent the first end 22 of the guide profile 20 instead of directly to the guide profile 20. The enclosure 64 includes an opening 72 (FIG. 4) in the bottom wall 66 thereof for receiving the first magnetic knuckle assembly 34 therethrough. The enclosure 64 further includes an elongated opening 76 in the top wall thereof to receive the second magnetic knuckle assembly 44 and to permit movement thereof along the length of the enclosure 64.

Figure 6:
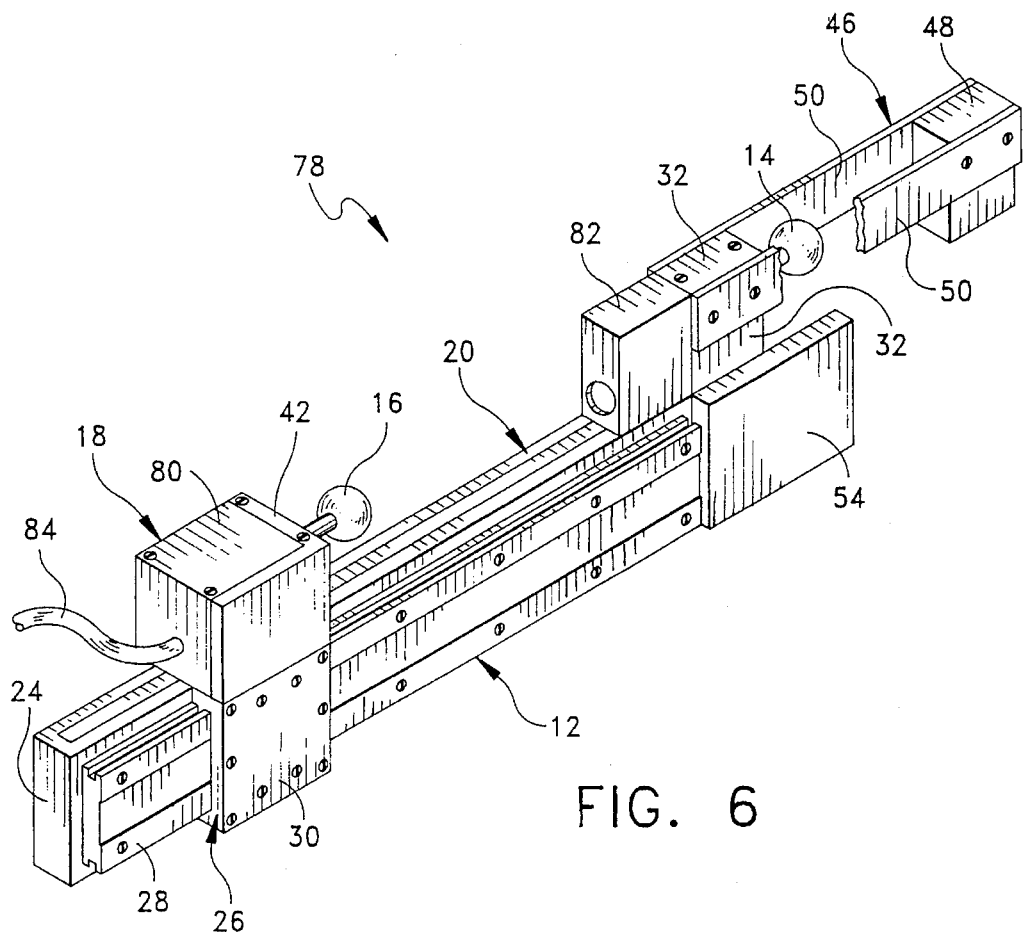
FIG. 6 is a perspective view of yet a third embodiment of the instant test gage.
Figure 7:
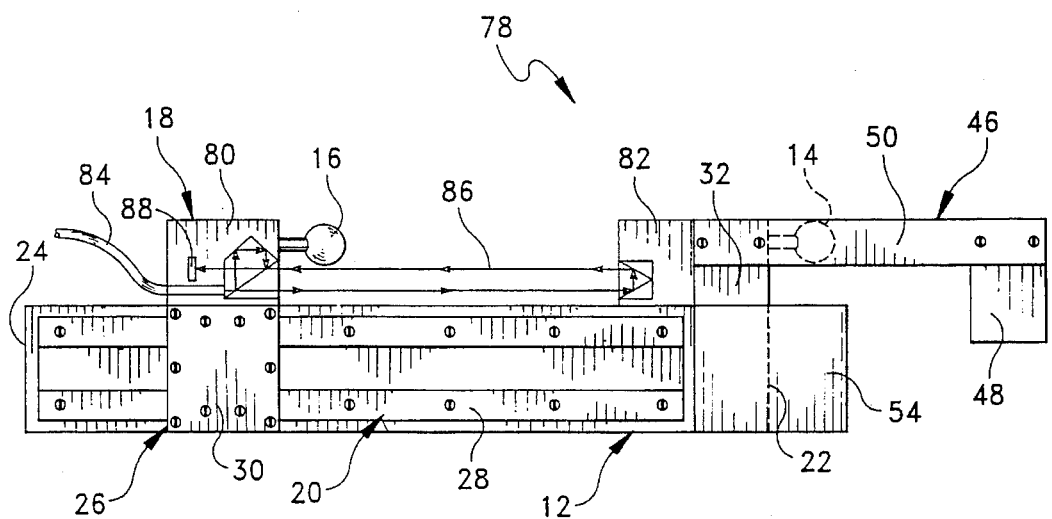
FIG. 7 is a side view thereof.

Referring now to FIGS. 6 and 7 a third embodiment of the instant linear test gage is illustrated and general indicated at 78. The linear guide assembly 12, first and second reference elements 14 and 16, counterweight assembly 46, and anti-rotation apparatus of this embodiment 78 are identical to the first embodiment 10. However, the linear measurement device 18 comprises a laser measurement system instead of a linear encoder device. The laser measurement system comprises a linear interferometer 80 mounted to the slide 30, and a linear reflector 82 mounted adjacent the first end 22 of the guide profile 20. The linear interferometer 80 is movable up and down the length of the guide profile 20 with the slide 30. A laser head (not shown) and fiber optic cable 84 are provided for firing a laser beam 86 (FIG. 7) through the interferometer 80 and down the length of the guide profile 20. It is also contemplated that the laser head could be directly mounted upon the slide 30 thereby eliminating the need for fiber optic cable 84. It is pointed out that the flange 42 includes an aperture (not shown) to allow the laser beam to pass therethrough. The laser beam 86 is reflected back towards the interferometer 80 by the linear reflector 82 at the opposite end of the guide profile 20. A laser detector 88 (FIG. 7) is mounted within the flange 42 for detecting the reflected laser beam 86 wherein linear measurements are read. The laser measurement system is operative for detecting the interference characteristics of the laser beam 86 as the linear interferometer 80 is moved towards and away from the linear reflector 82. By monitoring the interference characteristics of the laser beam 86, the distance between the first and second reference elements 14 and 16 can be accurately determined. Operation and measurement techniques utilizing a laser measurement system are well known in the art and therefore no further description of the laser measurement system is though to be necessary.

It can therefore be seen that the instant invention provides an effective test gage for testing the accuracy of machine tools. The instant gages 10, 62, and 78 each include a linear guide assembly 12 and measurement system 18 which allow long range linear measurements as well as circular or spherical trajectories at infinitely adjustable positions. The test gages 10, 62 and 78 further include a counterbalance assembly 46 for balancing the weight of the guide system 12 and measurement system 18. Still further, the test gages 10, 62 and 78 include anti-rotation apparatus to prevent rotation of the guide assembly 12 during testing. The instant test gages are simple to operate and significantly reduce test times. The test gages are also much more cost effective than the prior art devices. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A long-range linear test gage for testing the accuracy of a machine tool comprising:

a first reference element defining a first locus;

means for securing said first reference element so that said first locus is maintained in a fixed position with respect to said machine tools;

a second reference element defining a second locus;

means for securing said second reference element to an active element of said machine tool, said active element being operable for movement of said second locus along a predetermined trajectory;

a linear guide assembly comprising first and second guide portions which are slidably movable with respect to each other, said first reference element being secured to said first guide portion and said second reference element being secured to said second guide portion, said linear guide assembly permitting co-linear movement of said second locus with respect to said first locus over a distance of greater than one inch;

means for measuring a linear displacement between said first and second locus;

means for preventing rotation of said linear guide assembly;

said first reference element comprising a spherical ball attached to one end of said first guide portion, said means for securing said first reference element comprising a magnetic knuckle assembly having an upright body portion, said means for preventing rotation of said linear guide assembly comprising means for engaging said upright body portion of said magnetic knuckle assembly, said means for engaging said body portion of said magnetic knuckle assembly comprising a pair of spaced parallel arms which engage opposite side surfaces of said body portion.

2. A linear measurement test gage for testing the accuracy of a machine tool comprising:

a rigid linear guide profile having first and second ends;

a first ball ended reference element attached to said first end of said guide profile, said reference element defining a first locus at said first end of said guide profile;

a first engagement assembly for securing said first reference element in a fixed position with respect to said machine tool, said first engagement assembly and said first reference element cooperating to permit unrestricted rotational movement of said first reference element with respect to said first engagement assembly;

a linear guide assembly comprising a guide rail and a slide, said guide rail being secured to said guide profile along a longitudinal extent thereof, said slide being slidably movable relative to said guide rail between the first and second ends of said guide profile;

a second ball ended reference element secured to said slide, said second reference element defining a second locus which is movable relative to the first locus, said second engagement assembly and said second reference element cooperating to permit unrestricted rotational movement of said second reference element with respect to said second engagement assembly, said linear guide assembly permitting sliding co-linear movement of said second locus with respect to said first locus;

means for securing said second reference element to an active element of said machine tool, said active element being operable for movement of said second locus along a predetermined trajectory; and a linear measurement device for measuring a linear distance between said first and second loci as said second locus is moved along said predetermined trajectory.

3. In the linear measurement test gage of claim 2, said linear measurement device comprising scannable index measurement apparatus having a scannable measurement index secured to said guide profile and a scanning head mounted on said slide of said linear guide assembly for scanning said scannable measurement index as said second locus is moved along its predetermined trajectory.

4. The linear measurement test gage of claims 3 wherein said scannable measurement index apparatus comprises a magnetic tape apparatus.

5. The linear measurement test gage of claim 3 wherein said scannable measurement index apparatus comprises a reflective tape apparatus.

6. The linear measurement test gage of claim 3 wherein said scannable measurement index apparatus comprises a reflective glass apparatus.

7. In the linear measurement test gage of claim 2, said linear measurement device comprising a laser measurement system having a linear interferometer mounted on said slide of said linear guide assembly, means for directing a laser beam through said linear interferometer down the length of said guide profile, linear reflector means mounted on said guide profile at the first end thereof for reflecting said leaser beam back to said linear interferometer, and means for detecting said reflected laser beam.

8. The linear measurement test gage of claim 2 further comprising counterweight means extending beyond said first end of said guide profile for counterbalancing the weight of said guide profile, and linear guide and said linear measurement device.

9. The linear measurement test gage of claim 2 further comprising means for preventing rotation of said guide profile.

10. A measurement instrument for determining the spatial positioning accuracy of machines comprising:

a first reference element defining a first locus;

means for securing said first reference element in a fixed position relative to a machine tool, said first reference element and said means for securing said first reference element cooperating to permit unrestricted rotational movement of said first reference element with respect to said means for securing said first reference element;

a second reference element defining a second locus;

means for securing said second reference element to an active element of said machine tool, said active element being operable for movement of said second locus along a predetermined trajectory, said second reference element and said means for securing said second reference element cooperating to permit unrestricted rotational movement of said second reference element with respect to said means for securing said second reference element;

a linear guide assembly comprising first and second guide portions which are slidably movable relative to each other, said first reference element being secured to said first guide portion and said second reference element being secured to said second guide portion, said linear guide assembly permitting relative co-linear movement of said second locus with respect to said first locus as said second locus is moved along said predetermined trajectory;

an interferometer apparatus mounted on one of said first and second guide portions of said guide assembly, said interferometer apparatus having means for generating a signal indicative of the change in displacement between the first and second locus as said second locus is moved along said predetermined trajectory;

a source of light for providing a beam of light;

means for transmitting said beam of light from said source to a first point on said guide assembly, said first point being defined within said interferometer apparatus, said beam of light being directed toward a second point on said guide assembly;

a reflective means mounted on the other of said first and second guide portions of said guide assembly at said second point for reflecting said beam of light from said second point back towards said first point;

computer means responsive to an output signal of said interferometer apparatus for calculating the change in displacement between said first and second loci; and means for collecting said signal generated by said interferometer, and delivering said signal to said computer.

11. The measurement instrument of claim 10 further comprising a counterweight means on said guide assembly for counterbalancing a weight of said guide assembly, said interferometer apparatus and said reflective means.

12. The measurement device of claim 10, said linear guide assembly extending outwardly from said first reference element in a first direction, said counterweight means extending outwardly from said first reference element in an opposite direction from said linear guide assembly.

13. The measurement instrument of claim 12 further comprising an enclosure, said counterweight means being integrally formed with said enclosure.

14. The measurement instrument of claim 13 wherein said first guide portion is attached to said enclosure with resilient shock absorbent means.

15. The measurement instrument of claim 10 said first guide portion comprising a linear rigid guide profile and a guide rail attached thereto, said second guide portion comprising a slide adapted for sliding movement along said guide rail.

16. The measurement instrument of claim 15 wherein said interferometer apparatus is mounted on said slide and said reflective means is mounted at one end of said guide profile.

* * * * *